(No Model.)

G. LAND.
WATER RACE.

No. 249,954. Patented Nov. 22, 1881.

WITNESSES:
Theo. G. Hoster
C. Sedgwick

INVENTOR:
G. Land
BY Munn & Co.
ATTORNEYS.

UNITED STATES PATENT OFFICE.

GORDON LAND, OF ALAMOSA, ASSIGNOR TO HIMSELF AND ALFRED W. GEIST, OF PUEBLO, COLORADO.

WATER-RACE.

SPECIFICATION forming part of Letters Patent No. 249,954, dated November 22, 1881.

Application filed August 9, 1881. (No model.)

*To all whom it may concern:*

Be it known that I, GORDON LAND, of Alamosa, in the county of Conejos and State of Colorado, have invented a new and useful Improvement in Water-Races, of which the following is a full, clear, and exact description.

The object of my invention is such construction of the race that the sand and all other sedimentary matters brought into it by the current of the water may be trapped off and prevented from passing through the head gates of the race; and to this end my invention consists in forming a trap in the bottom of the race which communicates with waste-gates made in the side walls of the race in the manner hereinafter set forth.

Figure 1:
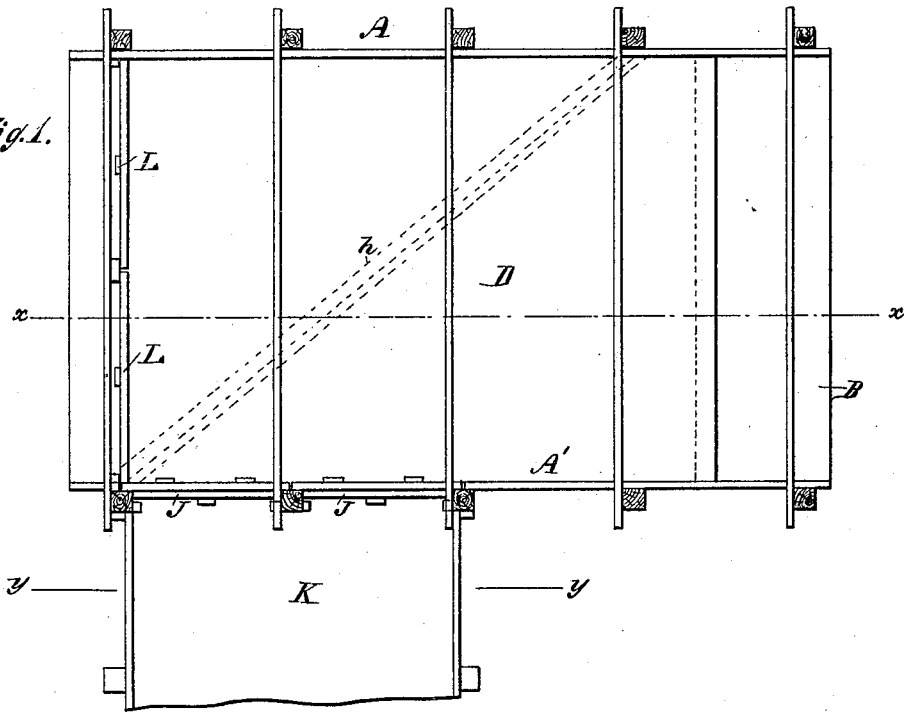
Figure 2:
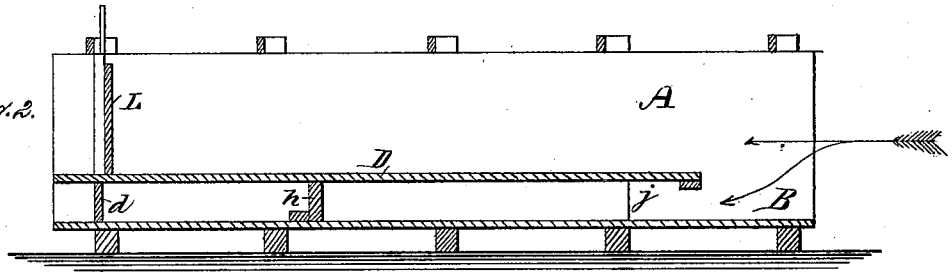
Figure 3:
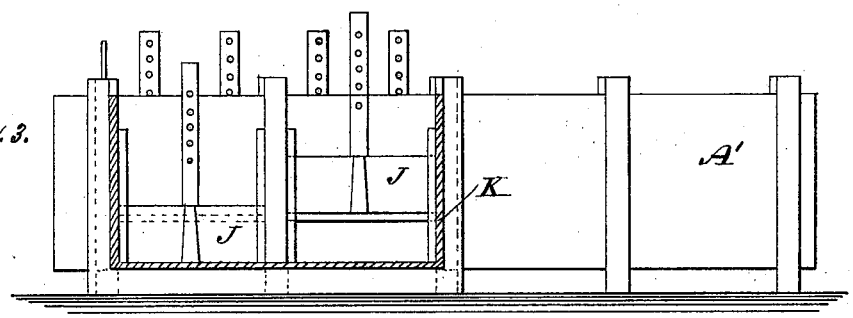

In the accompanying drawings, Figure 1 is a plan view of my improved race. Fig. 2 is a section thereof, taken on the line $xx$ of Fig. 1; and Fig. 3 is a side elevation of the race, showing the waste-gates, the waste-chute being shown in section on line $yy$ of Fig. 1.

Similar letters of reference indicate corresponding parts.

A and A' represent the side walls of the race, and B represents the bottom of the race. A short distance above the bottom B is placed the false bottom D, which is supported at its outer end upon the cleat $d$, and inside of the race it is supported upon the diagonal cleat $h$. The chamber formed by this diagonal cleat $h$ and the bottom B and false bottom D constitutes the trap $j$, which trap leads to and communicates with the gates J J in the side wall, A', of the race, as shown.

In order to conduct the sand and other sedimentary matter away from the race as it issues from the gates J, I provide the race with the side chute or wasteway, K, which is situated immediately in front of the gates.

The head gates, L L, are fitted in the outer end of the race in the ordinary way, and in the construction shown they rest upon the false bottom D, as clearly shown in Fig. 2.

It is obvious that the trap $j$ might be variously constructed, and, instead of being placed at the end of the race, near the head-gates, it might be placed in any part of the race and not depart from the spirit of my invention. By this triangular form the trap can be cleared without difficulty, as by leaving the gates J open or partly withdrawn the sand will drift away continually and the trap will never become filled, as the action of the water will carry the sand back into the main stream or down the wasteway.

Having thus described my invention, I claim as new and desire to secure by Letters Patent—

1. The water-race provided with the false bottom D, cleat $h$, and gates J J, the false bottom and the cleat being arranged to form the trap $j$, which communicates with the gates J J, as and for the purpose set forth.

2. The false bottom D, placed upon the diagonal cleat $h$, in combination with the bottom B of the race, the said parts being arranged to form the triangular trap $j$, substantially as described.

GORDON LAND.

Witnesses:
R. T. LYTLE,
GEO. H. KUHL.